Patented July 23, 1940

2,209,289

UNITED STATES PATENT OFFICE 2,209,289

MANUFACTURE OF RESINS FROM LIGNIN

Fredrick J. Wallace, Erie, Pa., assignor to Robeson Process Company, New York, N. Y., a corporation of New Jersey No Drawing. Application January 18, 1939, Serial No. 251,613

20 Claims. (Cl. 260—2)

This invention relates to the manufacture of resins from lignin; and it comprises methods for converting lignin into useful resins wherein recovered lignin is reacted with sufficient organic polybasic carboxylic acid to form complex resins containing a plurality of ether groups in addition to the ester groups so formed, the reaction sometimes being effected in the presence of alcohols, advantageously polyhydric alcohols which are reactive with the lignin and polybasic acid and with the reaction products thereof and which increase the complexity of the resins formed; and it further comprises the complex resins so obtained, said resins being soluble in various oxygenated organic solvents and fusible, and being useful in the manufacture of plastic and liquid coating compositions; all as more fully hereinafter set forth and as claimed.

As is well known, a substantial portion of vegetable tissue in such plant materials as hemp, jute, corn cobs, wood, straw, etc., is lignin. The lignin is largely in combination with cellulose in the form of what is termed ligno-cellulose. Lignin is a group name for the main non-cellulose components of wood fiber.

In making cellulose, or paper pulp, from wood the lignin component of the lignocellulose is attacked and removed by various reagents. In all cases it goes into solution in the form of a new combination. In the bisulfite method, the lignin unites with sulfurous acid to form new complex sulfur-containing materials, usually called lignosulfonic acids. These are of no interest here. In the alkaline processes of making paper pulp, which are largely in use, the reagent is an alkali; being sometimes caustic soda and sometimes a liquid also containing sulfides. The latter process is called the sulfate process, sodium sulfate being used in replenishing the alkali. It is also called the kraft process. The alkaline effluent liquids removed from the cellulose are called black liquor. In the black liquor the lignin removed from the wood is in combination with the alkali. On acidifying the liquid, the alkalinity is obviated and a precipitate produced. This is lignin which was in combination with the alkali and it is what is hereinafter called "recovered lignin." The precipitated lignin after washing and drying can be obtained as a dry, brown fine-grained material. It sometimes carries some resin which can be extracted with volatile petroleum oils.

The recovered lignins are non-resinous substances of high molecular weight and complex structure. They contain at least one aromatic residue and most of them have a molecular weight substantially above 1000. They also contain methoxy (ether) groups and free hydroxyl (OH) groups, some of which are of phenolic character. Although their exact chemical structure has not been yet determined, the lignins are a characteristic class of organic chemical compounds. However, their physical and other properties vary somewhat depending upon the source material and the conditions employed for extracting and recovering the lignin. Generally, they contain from 3 to 12 methoxy groups and from 3 to 11 hydroxyl groups per lignin molecule, the molecule being of complex condensed aromatic and aliphatic structure. Generically the formula for lignins as a class may be represented as follows:

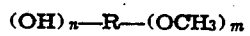

wherein R represents the lignin residue, $n$ is 3 to 11 and $m$ is 3 to 12. One or more of these hydroxyl groups are reactive, being capable of combining with acids or alcohols whereby such hydroxyl groups are converted into ester or ether groups respectively.

I have now discovered that lignin can be converted into useful resins by reacting it with organic polybasic carboxylic acids, the reaction product being a complex resin containing a plurality of ether groups in addition to the ester groups formed by esterification of the polybasic acid by lignin hydroxyls. That is under the present invention, the non-resinous lignin can be converted into valuable resins by heating it with an amount of organic polycarboxylic acid sufficient to form a complex resinous reaction product, the heating being continued until a fusible, soluble resin is obtained upon cooling.

Generally, only a minor amount of acid is required and the lignin furnishes the major portion of the resins obtained; it, of course, being chemically combined in the resulting reaction product. This reaction of the lignin with the acid and the resulting resinification of the lignin, readily occur at temperatures between 150° and 210° C.; and usually from 6 to 8 hours heating at such temperatures is sufficient to produce a resin having a low acid value, that is to cause most of the acid to go into combination. Of course, the temperature and time of heating depend somewhat upon the particular organic polycarboxylic acid employed and the proportion thereof with respect to a given lignin to be resinified. Various organic polycarboxylic acids may be employed for resinifying the lignin according to the present invention and I find that aliphatic and aromatic polycarboxylic acids are generally useful for this purpose. Likewise, the anhydrides of such acids may also be used. Each has certain advantages in producing particular types of resins, as is more fully shown and illustrated post.

By using phthalic acid or anhydride, I obtain resins in which the aromatic character of the lignin is fortified. For this and other purposes, I may use other aromatic or cyclic polycarboxylic acids, such as diphenic, camphoric, tetra-hydrophthalic acids etc., or their anhydrides. However phthalic acid or its anhydride give good commercial resins useful for many purposes and being readily available they are generally used to produce lignin resins. Aromatic acids carrying more than two carboxylic groups yield resins of greater complexity and this is sometimes advantageous.

On the other hand, by reacting the lignin with aliphatic polycarboxylic acids I obtain resins containing additional aliphatic groups or chains whereby the aliphatic structure of the lignin resin is further developed, giving such resins advantageous properties not possessed by lignin itself. Succinic acid is typical of such aliphatic polycarboxylic acids and may be used with advantage in the practice of the present invention. In lieu of succinic acid I may also use other aliphatic polycarboxylic acids such as glutaric, adipic, pimelic, suberic, azelaic, sebacic, etc. These acids may be represented by the following formula:

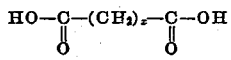

wherein $x$ is 2 to 8. Such dicarboxylic acids are advantageous in making certain types of lignin resins.

By using aliphatic acids carrying more than two carboxylic groups, resins of greater complexity may be obtained. In fact, in making lignin resins of very complex structure and extremely high molecular weight, I find it advantageous to employ aliphatic polybasic acids having other reactive groupings in addition to the carboxylic acid groups thereof, for instance, unsaturated and hydroxylated polycarboxylic acids.

An advantageous type of lignin resin is obtained by condensing lignin with maleic, fumaric and other unsaturated aliphatic polycarboxylic acids or their anhydrides.

Another advantageous type of resin is obtained by reacting lignin with hydroxylated polycarboxylic acids; a type of resin which contains ether groups in addition to the ether (methoxy) groups originally present in the lignin. In making such resins, various hydroxylated polycarboxylic acids, such as tartronic, malic, oxy-glutaric, tartaric, citric, tri-oxyglutaric acids and other aliphatic acids carrying two or more carboxylic groups and one or more hydroxyl groups may be employed. Such acids may be represented by the following formula:

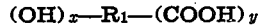

wherein $R_1$ represents the organic nucleus of the acid, $x$ is 1 to 4 and $y$ is 2 to 4. As the hydroxyl groups of lignin are reactive with alcoholic hydroxyls, as well as with carboxylic groups, some of them condense with the hydroxyl groups of such acids forming new ether groups in these resinous reaction products. As both the acid and hydroxyl groups of these acids react with the lignin, complex resins are readily obtained. By controlling the condensation, valuable resins containing residual hydroxyl groups, in addition to ether and ester groups, and having a wide range of solubility in volatile alcohols, ethers and esters can be obtained.

As I have found lignin resins containing additional ether groups to be advantageous, I sometimes employ ethers of polybasic acids such as diglycollic, dilactic and salicylacetic acids, to convert the lignin into this type of resin.

Also I may employ ketone acids such as benzoyl-benzoic acid and the like. With such acids, additional ketone groups are introduced into the lignin molecule in addition to esterifying the hydroxyls thereof. The lignin resins so made have improved solubility in ketone solvents.

In a general way, a synthetic resin may be defined as a polymerizate having random linkages in three planes; crystalline bodies having the linkages oriented. Reactants of complicated structure carrying a plurality of reactive groups give better resins than more simple materials. The resins, however, differ in their practical properties, solubility, fusibility, etc., and the present invention presents the possibility of making resins adapted for special purposes; a valuable possibility.

By the present invention, a wide range of useful resins may be obtained from recovered lignins by selecting various polycarboxylic acids as set forth ante, varying the ratio of acid to lignin and controlling the temperature and time of heating. Generally I have found that from 10 to 40 parts of polycarboxylic acid is sufficient to resinify 100 parts of lignin by weight, when the mixed acid and lignin are heated to between 150° and 210° C. Of course the time required to complete the reaction to the desired stage at a given temperature varies with the source of the lignin and its molecular weight and methoxy and hydroxy content and with the particular acid employed. But generally 4 to 20 hours heating are sufficient to give good resins with lignins containing 5 to 7 reactive hydroxyl groups. For instance, valuable resins are readily obtained by heating a mixture of 70 to 75 parts of lignin and 30 to 25 parts of either succinic or phthalic acids, or mixture of such acids, to between 160° and 190° C. for 6 to 8 hours.

My new resins obtained from lignin are fusible at moderate temperatures and are soluble in various volatile organic solvents, particularly alcohols, ethers, ketones and like oxygenated organic solvents. They are useful in the manufacture of molding compositions, both the simple molding and heat-setting types, and of surface coating compositions, both the plastic and liquid types.

Some lignin resins have excellent adhesive and bonding power and may be used as the binder in making plywood, abrasive wheels, friction brake linings, etc. That is, they are generally useful in molding and plastic compositions as a binder. For instance, they are useful additions to the plastic compositions used in making linoleum floor and wall coverings. They also can be compounded with mineral fillers such as asbestos or mica to produce cold molding compositions wherein said resins serve as the binder. For instance, my fusible, heat-hardening lignin resins can be melted with such fillers, then molded and baked to the infusible stage. Likewise, these fusible resins can be dissolved in suitable solvents and applied as a surface coating or a binder and baked to the infusible form.

Solutions of the lignin resins of the present invention in volatile solvents are quite generally applicable as liquid coating compositions and as a varnish base. These solutions of the resin, alone or together with cellulose esters, phenol aldehyde resins, natural gums or resins, etc., are excellent varnishes and lacquers and may be used for coating electrical cable, impregnating laminated products and electrical insulation and in making laminated glass. These resins are also useful in making printing inks.

In alkaline methods of making paper pulp the wood is chipped and then cooked in digestors with the alkaline liquor under pressure until the cellulose is separated from the other constituents of the wood; lignin dissolving to form black liquor. Kraft liquor contains both caustic soda and alkaline sulfides and sulfates. Precipitated lignin recovered by acidifying black liquor is separated from the mother liquor by filtration, decantation, centrifuging etc., is washed with water, advantageously acidulated water, to remove adhering mother liquor and any occluded or adsorbed salts and other water soluble matter, and the washed lignin is then dried. A brown powder is usually obtained. Sometimes the dried lignin is ground. As stated the dried lignin may be extracted with organic solvents capable of dissolving fats, resinous matters etc., to produce a purified high grade lignin. For this extraction toluene, xylene and other volatile organic solvents may be used. The dried lignin, with or without such an extraction, may be re-dissolved in alkaline aqueous liquids, such as dilute caustic soda solution, and re-precipitated to produce a purer product. Very pure lignins substantially free of all inorganic and organic impurities give high grade resins.

In precipitating the lignin any suitable acid or acid substance capable of lowering the pH of the liquor to below 7.0 pH may be used. I ordinarily use sulfuric acid in such quantity and dilution as may be necessary. The amount required may vary from 2.5 to 5.0 per cent of sulfuric acid on the weight of the liquor, depending upon the initial free alkalinity and the buffer action of the salts present. Generally sufficient sulfuric acid is added to lower the pH value substantially below 7.0; that is, enough acid is added to render the liquor definitely acid. Advantageously the acidity may be greater with a pH between 1 and 5; the lignin being precipitated and coagulated into a form which may be readily separated from the mother liquor by filter pressing.

While I may use other acids, sulfuric acid is ordinarily employed and has certain advantages. It converts caustic soda and sodium salts into sulfates and after removal of the lignin, the mother liquors may be treated with an alkali to neutralize acidity and further processed to recover and utilize the inorganic compounds dissolved therein.

The following examples illustrate my processes for recovering lignin from black liquors by acid precipitation:

*Example 1*

This example illustrates the recovery of lignin from a commercial soda black liquor having a density of 13.8° Baumé and a solid content of 16.1 per cent. To this black liquor sulfuric acid is added in the ratio of 45 pounds of sulfuric acid diluted with 90 pounds of water for each 1000 pounds of black liquor. The mixture is allowed to stand for about 16 hours until all the lignin is precipitated and is sufficiently coagulated to permit ready separation from the mother liquor. The lignin is filtered and washed with 150 pounds of water acidified with sulfuric acid to pH 3.5. The lignin is stirred with the acidified water. The washed lignin is dried and ground. Approximately 45 pounds of dry lignin are obtained from the quantities stated.

Lignin may also be recovered in similar manner from kraft, or sulfate process, black liquor as in the following example using a kraft liquor having 19.10 per cent total solids.

*Example 2*

In this example, as in the preceding example, sulfuric acid diluted with twice its weight of water is added in a proportion of 45 pounds of acid to 1000 pounds of this kraft liquor. The mixture is allowed to stand for 16 hours and is then heated to 160° F. to complete precipitation.

The lignin is washed by suspending it in 200 pounds of water acidified to a pH of 2.3 with sulfuric acid. After a thorough washing it is dried and fine ground to a powder. About 82 pounds of a light brown powder are obtained.

Sulfuric acid is advantageous for precipitating sulfate or kraft liquors in that it also serves to decompose the sulfur compounds. Mercaptides are decomposed and the volatile mercaptans are removed in heating the acidified liquor.

Lignin preparations useful for the present purposes can also be obtained from a wide variety of vegetable materials digested with alkaline solutions, such as hemp, jute, corn cobs, straw, etc.; the lignin being precipitated with sulfuric acid and recovered.

Lignin may be precipitated otherwise than with sulfuric acid and like strong acids. I have found that blowing black liquors with gases such as chlorine, $CO_2$ and $SO_2$, useful lignin preparations can be made. The precipitated lignin is washed with acidified water and processed as set forth ante.

The following example illustrates this method of recovering lignin by gassing soda black liquor with carbon dioxide.

*Example 3*

A batch of 1000 pounds of a soda black liquor in a suitable vat equipped with an agitator is gassed with carbon dioxide, passed through an alundum diffuser until the liquor is saturated and the lignin precipitated. This requires 194 pounds of $CO_2$ for this particular black liquor. The precipitated lignin is washed by suspending it in 150 pounds of water acidified to pH 3.5 with sulfuric acid. The washed lignin is dried and ground; approximately 39 pounds of a light brown powder being obtained. The recovered lignin made in this way from this liquor fuses at about 158° C. without decomposition.

Generally, the lignins recovered from soda liquor, either by gassing such liquors or by acidifying with strong acids, are fusible at the reaction temperatures employed in the present invention for making lignin resins. They may be readily fused with admixed polybasic acid, and resinified, giving good lignin resins. On the other hand, the lignins recovered from sulfate or kraft liquors by acid precipitation are substantially infusible. However, they are soluble in aliphatic alcohols and other oxygenated solvents and may be fluxed with the aid of such solvents. For this purpose I employ minor amounts of oxygenated organic liquids which are solvents for lignin. The aliphatic monohydric and polyhydric alcohols, particularly the latter, are advantageous and are ordinarily employed. Mixtures of monohydric and polyhydric aliphatic alcohols may also be used for this purpose. The alcohol used for fluxing generally also functions as a reactant; it takes part in forming a resin. Using the infusible lignins with phthalic anhydride, the anhydride melts at 130° C. and fluxes the mass to a homogeneous mixture.

In other words, I sometimes resinify the lignin with polybasic acids, in the presence of alcohols, preferably polyhydric alcohols which are reacted with the lignin and polybasic acid and with the reaction products thereof. Thus, in the practice of the present invention, the lignin may be first fluxed with a polyhydric or monohydric alcohol or mixtures of these, at elevated temperatures, and then the polybasic acid added to the hot and molten mixture, after which the mixture is further heated until the reaction is complete. By such processes, I obtain complex resins containing ether groups and ester groups in addition to those originally present in the lignin and formed by esterification of the acid with the lignin. Such resins have improved solubilities in oxygenated organic solvents, particularly volatile ethers and esters.

In making such lignin resins it is advantageous to employ dihydric and other polyhydric aliphatic alcohols. By employing dihydric alcohols I obtain lignin resins which are permanently fusible and particularly suitable for thermoplastic molding compositions, worked or shaped while hot and setting when cooled.

For making such permanently fusible lignin resins, glycol is advantageous as the dihydric alcohol. It has marked solvent action upon lignin and readily fluxes it for reaction with the polybasic acid. Derivatives of glycol such as monoethylene glycol ether (cellosolve), di-ethylene glycol ether and other alkyl ethers of glycol or poly-glycols are useful. The glycol ethers can be used as fluxes for lignin but they also usually take part in reaction; they contribute to the final product. These glycol ethers being solvents for the lignin of wood, may be used in extracting wood and then resinified.

Using polyhydric alcohols, it is possible to produce soluble, fusible lignin resins capable of being heat-hardened into insoluble, infusible resins; for making molding compositions which can be hot pressed and heat hardened in the mold under pressure. They are also useful in making baking varnishes and enamels. In making this type of lignin resin I ordinarily employ trihydric alcohols such as glycerin but other polyhydric alcohols such as polyglycerol, polyglycols, pentaerythritol, sorbitol, mannitol, hexahydroxy-cyclohexane etc. may be used.

To produce soluble, fusible lignin resins capable of being heat-hardened, I find it advantageous to react the lignin with cyclic dicarboxylic acids in the presence of trihydric alcohols at temperatures between 150 and 210° C. and then check the condensation at the desired stage by cooling the molten resin.

In making either permanently fusible thermoplastic or heat-hardening lignin resins, I find that in general good results are obtained by mixing 13 to 50 parts of the alcohol with 50 to 75 parts of lignin and heating the mixture to between 150 and 210° C. for from 1 to 2 hours and then adding from 25 to 36 parts of the polybasic acid and continuing the heating at said temperatures for from 3 to 6 hours. The parts are parts by weight. During the first heating, the alcohol fluxes the lignin into a molten mass with which the acid can be readily admixed. During this heating some of the alcohol reacts with the lignin, introducing additional ether groups into the lignin molecule, but the alcohol primarily serves as a solvent during the early stages of the action. During the second and more prolonged heating, substantially all of the alcohol may become chemically combined. By controlling the conditions, I can produce resins containing free alcoholic hydroxy groups in addition to the ether and ester groups. Where a polyhydric alcohol such as glycerine is used, some of the hydroxyls may be combined and others remain.

The following examples are illustrative embodiments of my generic invention and the various modifications thereof described ante.

Example 4

This example illustrates the formation of resin substances with utilization of dibasic acid anhydrides such as phthalic anhydride. Phthalic anhydride is brought into reaction with the lignin such as that given in Example 1 at a temperature of 190° C. for a period of six hours with constant agitation; the ratio of lignin to phthalic anhydride being about 70:30. This forms a dark-colored and very tough flexible resin containing no free acid.

Example 5

In making a resin with use of polybasic aliphatic acids such as succinic acid, lignin can be heated for 8 hours at 190° C. with succinic acid, using 75 parts lignin for 25 parts succinic acid. A tough flexible dark-colored resin is produced.

Example 6

This example illustrates the formation of a resinous substance by the reaction of lignin from soda process liquor as described in Example No. 1, with an aliphatic, polybasic acid in the presence of dihydric alcohol. Ethylene glycol is used to dissolve lignin, 75 parts lignin being used with 15 parts of the glycol. The mixture is heated to a temperature of 150° C. for two hours. At the end of this time 25 parts succinic acid are added and heating is continued at 150° for a period of 5 hours. Dark colored, tough, flexible resin is formed. At this point the resin is soluble in the usual lignin solvents, that is monohydric and polyhydric alcohols, esters, ketones, etc. Continued heating at 180° C. converts the resin into an insoluble form.

Example 7

This example is illustrative of the formation of the resinous substance by reacting lignin recovered from soda process liquor by precipitation with carbon dioxide (Example No. 3) with an aliphatic, polybasic acid in the presence of a polyhydric alcohol. In so doing 50 parts lignin (Example No. 3) are mixed with 20 parts of glycerine and the mixture heated to 210° C. for a period of 2 hours. The mixture is then cooled to 150° C. and 30 parts of succinic acid added. The temperature is raised to 200° C. and continued for a period of 3 hours with constant agitation. At this point the resin produced is dark colored, very tough, and flexible, soluble in ketones, alcohols, and esters. Continued heating converts it into an insoluble infusible form.

Example 8

This example is illustrative of the formation of a resinous substance by the reaction of lignin with a cyclic, dibasic acid in the presence of a polyhydric alcohol. In so doing 75 parts lignin isolated from kraft soda liquor as in Example No. 2 are mixed with 16 parts diethylene glycol and heated together with constant agitation at 160° for two hours. To the mix 36 parts of phthalic acid are added. The whole is heated to 160° with constant stirring for 6 hours. The resulting, tough, flexible resin is permanently fusible and is not converted into the infusible state by continued heating. It is soluble in ketones, esters, and alcohols and is miscible with (compatible with) cellulose ester solutions and with solutions of other resinous materials soluble in mutual solvents.

*Example 9*

This example illustrates the formation of a resinous substance by the reaction of lignin with a cyclic dibasic acid in the presence of a polyhydric alcohol. In so doing 60 parts of lignin (Example No. 1) are mixed with 50 parts of glycerol and the whole heated to 210° for a period of 2 hours. Heating is continued after addition of 25 parts of phthalic acid for 6 hours at 210° C. The resin at this point is fusible and soluble in esters, ketones and alcohols. Continued heating of resin for 8 hours at 250° converts the resin into an insoluble, infusible form. The resin in the fusible state is suitable for incorporation in molding compositions or in surface coating compositions.

*Example 10*

This example illustrates the formation of resinous substances by the reaction of lignin with cyclic, dibasic acid anhydrides in the presence of polyhydric alcohols. In so doing 60 parts of lignin (Example No. 1) are mixed with 15 parts of glycerine and the whole heated one hour at 190° C. Heating is continued after adding 25 parts phthalic anhydride for four hours at 210° C. The resin at this point is soluble in esters, alcohols, ketones, etc. and is fusible. In this condition it is suitable for incorporation in molding compositions, surface coatings, etc. The continued heating of the resin at 250° C. converts it into an insoluble, infusible form.

*Example 11*

This example illustrates the formation of a resinous substance by the reaction of lignin with a cyclic, dibasic acid anhydride in the presence of a polyhydric alcohol. An admixture is made of 75 parts of lignin (Example No. 2) with 20 parts di-ethylene glycol. The mixture is heated at 160° for a period of two hours, and 30 parts of phthalic anhydride added. Heating is continued at 168° for a period of six hours. The resin is soluble in esters, alcohols, and ketones, and is permanently fusible. Continued heating at higher temperatures does not convert it into the infusible state.

*Example 12*

This example illustrates the formation of resinous substances by the reaction of lignin with polybasic, ether acids, in the presence of polyhydric alcohols. Lignin (Example No. 1) is mixed with glycerol in the proportion of 75 and 30 and the mixture heated to 160° for one hour. An addition of 30 parts di-glycolic acid is then made and heating continued six hours at 160°. The resin thus formed is tough, hard, and flexible and is soluble in the usual alcohol, ketone and ester solvents.

*Example 13*

This example illustrates the formation of resinous substances by the reaction of lignin with mixtures of polybasic aliphatic acid and cyclic, dibasic acids in the presence of polyhydric alcohol. In this operation 75 parts lignin is mixed with 18 parts of glycerol and the mixture heated to 150° C. for a period of two hours. After an addition of 12 parts of phthalic anhydride and 14 parts of succinic acid heating is continued at 180° for six hours, finally raising the temperature to 200° for two additional hours. The resin at this point is tough, flexible and fusible. Continued heating for five hours at 250° C. converts the resin into an insoluble, infusible form.

The lignin resins produced by the foregoing examples are typical of the various types of resins for various purposes which may be produced according to this invention. A wide range of resins having adjusted solubility and fusibility may be obtained. But, all of these resins contain a modified lignin nucleus carrying ether as well as ester groups.

What I claim is:

1. As a new and useful composition of matter, an improved lignin resin containing a plurality of ether and ester groups, said resin being soluble in oxygenated organic solvents and being a fusible resinous reaction product of recovered lignin and an organic polycarboxylic acid, said recovered lignin being obtained from black liquor by precipitating the lignin in such liquor with an acid substance and recovering the precipitated lignin.

2. The composition of claim 1 wherein said lignin resin is a resinous reaction product of recovered lignin, an organic polycarboxylic acid and a polyhydric alcohol.

3. The composition of claim 1 wherein said lignin resin is permanently fusible and is a resinous reaction of recovered lignin, an organic polycarboxylic acid and a dihydric aliphatic alcohol.

4. The composition of claim 1 wherein said lignin resin is a fusible resin capable of being heat-hardened and is a resinous reaction product of recovered lignin, a cyclic dicarboxylic acid and a trihydric aliphatic alcohol.

5. In the manufacture of useful resins from recovered lignin obtained from black liquor by precipitating the lignin in such liquor with an acid substance and recovering the precipitated lignin, the step which comprises reacting the recovered lignin with sufficient organic polycarboxylic acid to form a resin containing a plurality of ether and ester groups, the resin so formed being soluble and fusible.

6. The process of claim 5 wherein recovered lignin is mixed with an organic dicarboxylic acid in a ratio approximating 70 to 30 and the mixture is heated to between 160° and 190° C. until a fusible soluble resin is obtained upon cooling.

7. The process of claim 5 wherein said reaction is effected in the presence of a polyhydric aliphatic alcohol.

8. In the manufacture of soluble fusible resins containing a plurality of ether and ester groups from recovered lignin obtained from black liquor by precipitating the lignin in such liquor with an acid substance and recovering the precipitated lignin, the process which comprises fluxing the recovered lignin with a minor amount of an alcohol by heating a mixture of the lignin and alcohol to between 150° and 210° C., adding an organic polycarboxylic acid to the molten mixture and continuing the said heating until a soluble fusible lignin resin is obtained upon cooling to room temperature.

9. The process of claim 8 wherein said alcohol is a polyhydric aliphatic alcohol.

10. The process of claim 8 wherein said alcohol is glycol.

11. The process of claim 8 wherein said alcohol is glycerine.

12. The process of claim 8 wherein said acid is an aromatic dicarboxylic acid.

13. The process of claim 8 wherein said acid is an aliphatic polycarboxylic acid.

14. The process of claim 8 wherein said acid is an hydroxylated polycarboxylic acid.

15. The process of claim 5 wherein a mixture of aliphatic and aromatic polycarboxylic acid is reacted with the lignin.

16. The process of claim 8 wherein a mixture of aliphatic alcohols is employed for fluxing the lignin, at least one of the alcohols being chemically combined during the subsequent heating with the organic polycarboxylic acid.

17. As a new composition of matter, useful for plastic and coating purposes, a fusible lignin resin soluble in oxygenated organic solvents and containing recovered lignin esterified and resinified by an organic poly-carboxylic acid, the said recovered lignin being obtained from black liquor by precipitating the lignin in such liquor with an acid substance and recovering the precipitated lignin.

18. The composition of claim 17 wherein the lignin is recovered from caustic soda black liquor.

19. The composition of claim 17 wherein the lignin is recovered from sulfate black liquor.

20. In the manufacture of improved lignin resins, the process which comprises precipitating lignin from black liquor by adding an acid substance to said liquor, separating and recovering the so-precipitated lignin and reacting the so-recovered lignin with sufficient organic poly-carboxylic acid to convert said lignin into an esterified lignin resin containing a plurality of ether and ester groups, the lignin resin so formed being fusible and being soluble in oxygenated organic solvents but insoluble in water.

FREDRICK J. WALLACE.